United States Patent
Yang et al.

(10) Patent No.: US 9,708,459 B2
(45) Date of Patent: *Jul. 18, 2017

(54) RUBBER COMPOSITION AND METHOD FOR LOW RESIN CROSSLINKING

(71) Applicants: Compagnie Generale des Etablissements Michelin, Clermont-Ferrand (FR); Michelin Recherche et Technique S.A., Granges-Paccot (CH)

(72) Inventors: Xiaofeng Shaw Yang, Simpsonville, SC (US); Jesse J. Arnold, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/431,028

(22) PCT Filed: Sep. 25, 2013

(86) PCT No.: PCT/US2013/061758
§ 371 (c)(1),
(2) Date: Mar. 25, 2015

(87) PCT Pub. No.: WO2014/052497
PCT Pub. Date: Apr. 3, 2014

(65) Prior Publication Data
US 2015/0252167 A1    Sep. 10, 2015

Related U.S. Application Data

(60) Provisional application No. 61/705,521, filed on Sep. 25, 2012.

(51) Int. Cl.
| | |
|---|---|
| C08K 3/36 | (2006.01) |
| B60C 1/00 | (2006.01) |
| C08K 3/04 | (2006.01) |
| C08K 5/17 | (2006.01) |
| C08K 5/18 | (2006.01) |
| C08L 7/00 | (2006.01) |
| C08L 9/00 | (2006.01) |

(52) U.S. Cl.
CPC .................. *C08K 3/36* (2013.01); *B60C 1/00* (2013.01); *C08K 3/04* (2013.01); *C08K 5/17* (2013.01); *C08K 5/18* (2013.01); *B60C 1/0016* (2013.04); *C08L 7/00* (2013.01); *C08L 9/00* (2013.01)

(58) Field of Classification Search
CPC .... C08K 5/17; C08K 5/18; C08L 9/00; C08L 7/00; C08L 2312/00
See application file for complete search history.

(56) References Cited

U.S. PATENT DOCUMENTS

| | | |
|---|---|---|
| 7,798,190 B2 | 9/2010 | Chauvin |
| 2007/0112120 A1 | 5/2007 | Vasseur |
| 2007/0193669 A1 | 8/2007 | Giannini et al. |

FOREIGN PATENT DOCUMENTS

| | | |
|---|---|---|
| GB | 1112007 A | 5/1968 |
| WO | WO2010/017673 A1 | 2/2010 |

OTHER PUBLICATIONS

International Search Report with Written Opinion dated Dec. 4, 2013.

*Primary Examiner* — Peter D Mulcahy
(74) *Attorney, Agent, or Firm* — Frank J Campigotto

(57) ABSTRACT

Tire components comprising rubber compositions based upon cross-linkable elastomer composition, the cross-linkable elastomer compositions including, per 100 parts by weight of rubber (phr), a highly unsaturated diene elastomer, a reinforcing filler and a methylene acceptor of the form

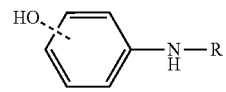

wherein R is selected from H, an alkyl moiety, a cycloalkyl moiety, an aryl moiety, an amine moiety or combinations thereof. The rubber compositions include a methylene donor in an amount that provides little or no change in the rigidity of the cured rubber composition. Since the methylene acceptor may be described as having antidegradant properties, then resulting rubber composition has improved resistance to degradation.

18 Claims, No Drawings

RUBBER COMPOSITION AND METHOD FOR LOW RESIN CROSSLINKING

BACKGROUND OF THE INVENTION

Field of the Invention

This invention relates generally to rubber compositions and more particularly, to rubber compositions having low resin cross-linking, methods for making them and articles made from such rubber compositions.

Description of the Related Art

Tires and other articles that are made of rubber are manufactured from rubber compositions that include rubber, e.g., natural rubber, synthetic rubber or combinations thereof, as well as fillers, plasticizers, vulcanizing agents and other chemicals that improve the physical characteristics of the cured rubber composition. One class of materials that may be added to the rubber compositions is resin.

Resins are typically (but not always) nonvolatile, solid organic substances that are produced naturally by plants or synthetically from petrochemicals or other sources of hydrocarbon materials. As used in rubber compositions, resins may be classified as either reinforcing resins or as plasticizing resins. Plasticizing resins are added to a rubber composition to improve the plasticity or workability of a rubber composition. They are often added as a substitute for or in addition to a processing oil and are known to improve the resulting physical characteristics of the cured rubber composition.

Reinforcing resins are added to a rubber composition to increase the rigidity of the cured rubber composition. These reinforcing resins intermix with the rubber polymer chains and, when reacted with a linking agent or with each other, form a three-dimensional network that improves the physical characteristics of the cured rubber composition. Many of these resins are classified as methylene acceptor/donor systems that react together to generate a three-dimensional reinforcing resin network by a condensation reaction.

In addition to resins, other additives are known to be added to rubber compositions to improve their physical properties, such additives including antioxidants, antiozonants, anti-reversion agents and so forth. Such additives are well known in the rubber industry.

SUMMARY OF THE INVENTION

Particular embodiments of the present invention include rubber compositions, articles made from such rubber compositions and methods for making same. Such embodiments include a method for manufacturing a cross-linkable rubber composition that includes blending together components of the cross-linkable rubber composition into a non-productive mix, the components including a highly unsaturated diene elastomer, a reinforcing filler and a methylene acceptor of the form

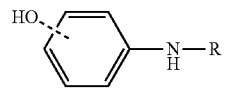

wherein R is selected from H, an alkyl moiety, a cycloalkyl moiety, an aryl moiety, an amine moiety or combinations thereof. Such methods may further include cooling the non-productive mix and mixing a methylene donor and a vulcanizing agent into the non-productive mix to convert the non-productive mix to a productive mix. The vulcanizing agent is a material that causes the cross-linkage of the rubber such as sulfur or a peroxide.

Particular embodiments that include the methylene acceptor may have a methylene acceptor of the from

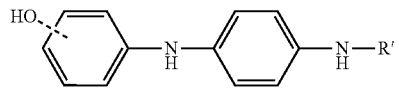

wherein R' is selected from H, an alkyl moiety, a cycloalkyl moiety, an aryl moiety, an amine or combinations thereof.

The amount of methylene donor included in particular embodiments may be provided in amounts that provide a significant change in rigidity of the rubber composition when cured or may be provided in amounts that provide little or no change in such rigidity.

Particular embodiments include tire components comprising rubber compositions based upon cross-likable elastomer composition, the cross-linkable elastomer compositions including, per 100 parts by weight of rubber (phr), a highly unsaturated diene elastomer, a reinforcing filler and a methylene acceptor of the form

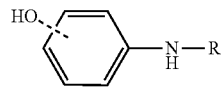

wherein R is selected from H, an alkyl moiety, a cycloalkyl moiety, an aryl moiety, an amine moiety or combinations thereof.

The foregoing and other objects, features and advantages of the invention will be apparent from the following more detailed descriptions of particular embodiments of the invention.

DETAILED DESCRIPTION OF PARTICULAR EMBODIMENTS

Particular embodiments of the present invention include methods for producing rubber compositions that have low resin cross-linking where the resin advantageously provides protection against degradation to the cured rubber compositions through the cross-linked resin properties. Such cross-linking resins can provide antidegradant protection, for example, against ozone attack, oxidation, flex fatigue, ageing, high temperature degradation and catalytic degradation by copper or other heavy metals.

Other embodiments include rubber compositions made by such methods as well as rubber articles, including tire components, belts, hoses and so forth made with the rubber compositions and their methods of making. Yet other embodiments include such methods and articles using the same resin cross-linking but without the constraint of having the low level of cross-linking.

More particularly the cross-linking resins that provide improved antidegradation properties contain specific methylene acceptors useful in methylene acceptor/donor systems that may be useful as reinforcing resins in rubber compositions. However, in particular embodiments, instead of providing a normal amount of methylene donor necessary to provide a significant increase in the rigidity of the rubber composition, only a very small amount of the methylene donor is provided. In other embodiments, where an increase in rigidity may be desired, a greater amount of the methylene donor may be added.

As has been noted, for some embodiments it has been surprisingly discovered that when the very small amount of the methylene donor is provided in the rubber composition having the specific methylene acceptor, the linkages formed during the resinification are not so extensive so as to significantly increase the rigidity of the rubber composition but instead the cured rubber demonstrates a significant increase in its degradation resistance, e.g., to ozone attack, fatigue failure and cohesive properties, while at the same time increasing the duration of that protection.

Advantageously the cross-linking between the methylene acceptor and the methylene donor makes the methylene acceptor part of a larger molecule so that its ability to migrate to other parts of the tire and/or away from the tire is significantly decreased and yet during the mixing process, when the methylene acceptor is mixed into the rubber composition, the molecule is still small enough so that good dispersion of the methylene acceptor can be achieved. As known to those skilled in the art, the larger the molecule to be mixed into the rubber composition, the more difficult it is to achieve good dispersion during the mixing process.

As used herein, "diene elastomer" and "rubber" are synonymous terms and may be used interchangeably.

As used herein, a "non-productive" mix includes many of the components of a rubber composition but includes no vulcanization agents and typically no primary accelerators. A "productive" mix results after the vulcanization agents and typically any primary accelerators are added to the non-productive mix. Vulcanization agents as used herein are those materials that cause the cross-linkage of the rubber and therefore are added only to the productive mix so that premature curing does not occur As used herein, "based upon" is a term recognizing that embodiments of the present invention are made of vulcanized or cured rubber compositions that were, at the time of their assembly, uncured. The cured rubber composition is therefore "based upon" the uncured rubber composition. In other words, the cross-linked rubber composition is based upon or comprises the constituents of the cross-linkable rubber composition.

Reference will now be made in detail to embodiments of the invention, provided by way of explanation of the invention. For example, features illustrated or described as part of one embodiment can be used with another embodiment to yield still a third embodiment. It is intended that the present invention include these and other modifications and variations.

The disclosed rubber compositions are useful for many types of articles that are made of rubber including tires, rubber coatings, vibration dampeners, tool grips, tools and so forth. Tires are made of many rubber parts and the disclosed rubber compositions are useful for such tire components as, for example, sidewall components, bead area components, shoulder components, treads, undertreads and/or rubber coatings, such rubber coating useful, for example, for the cords, plies and/or belts of the tire, such components being well known to those in the tire field.

As noted above, one surprising improvement in the rubber composition's anti-degradation properties results from the addition of a very small quantity of methylene donor with a methylene acceptor that may be characterized as having an antidegradant property so that the ability of the methylene acceptor to diffuse through the tire is limited. Methylene acceptors and methylene donors and their use in methylene acceptor/donor systems are well known in the art for their ability to increase the rigidity of a rubber composition. In such systems the methylene donor reacts with the methylene acceptor to generate a three-dimensional reinforcing resin network by a condensation reaction that, when formed in the rubber composition, provides it, inter alia, with increased rigidity.

However, as noted, by adding just a small amount of the methylene donor, the rigidity is not significantly increased but the small amount of linking that occurs causes the molecules to become somewhat larger (but not nearly as large as the typical resin network when larger amounts of methylene donors are added), thereby hindering their ability to migrate through the rubber. Such compositions demonstrate an improvement in their ability to resist degradation and the antidegradation properties will last longer since the antidegradant is somewhat constrained from migration.

An example of a useful methylene acceptor is of the form

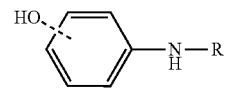

wherein R can be selected from H, an alkyl moiety, a cycloalkyl moiety, an aryl moiety, an amine moiety or combinations thereof. In particular embodiments, R is not a single phenyl moiety. In other embodiments, R' may be any one of these moieties without combination. In particular embodiments, the number of hydroxyl moieties may be one and in other embodiments, it may be two. In other embodiments, R is not a single phenyl moiety and is specifically excluded. Such compounds are well known by those having ordinary skill in the art and their methods for being synthesized are also known.

For example, when R is an H, the resulting compound is the aminophenol and when R is a methyl moiety, the compound becomes methyl-aminophenol. Likewise, when R is a cycloalkyl moiety or includes both a cycloalkyl moiety and an amine moiety, the methylene acceptor is of the form

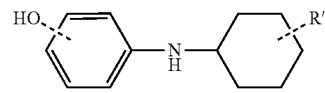

wherein R' is an H to form a cycloalkyl hydroxylphenol and where R' is an amine to form a cycloalkylamino hydroxylphenol. Such compounds are known, examples of which can be found in U.S. Pat. Nos. 2,200,283 and 4,713,488, both of which are hereby fully incorporated by reference. In particular embodiments disclosed herein, R' may be an H, an alkyl moiety, a cycloalkyl moiety, an aryl moiety, an amine moiety or combinations thereof. In other embodiments, R' may be any one of these moieties without combination. In yet other embodiments, R' may be limited to an H, an alkyl moiety, an amine moiety or combinations thereof.

By way of additional examples, when R is a combination of an aryl moiety and an R' moiety, the resulting methylene acceptor is of the form

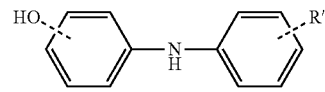

wherein R' may be an H, an alkyl moiety, a cycloalkyl moiety, an aryl moiety, an amine moiety or combinations thereof. In other embodiments, R' may be any one of these moieties without combination. In yet other embodiments, R' may be limited to an H, an alkyl moiety, an amine moiety or combinations thereof. As an example when R' is an H, the resulting methylene acceptor is hydroxyldiphenylamine, also known as HDPA. In some embodiments R' is not H and is specifically excluded as a moiety. When R' is, for example, a combination of an amine moiety and another moiety R", the resulting methylene acceptor is a hydroxyphenyl-phenylenediamine of the form

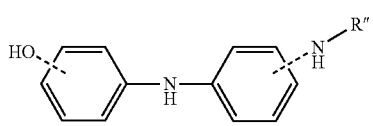

In particular embodiments disclosed herein, R" may be an H, an alkyl moiety, a cycloalkyl moiety, an aryl moiety, an amine moiety or combinations thereof. In other embodiments, R" may be any one of these moieties without combination. In yet other embodiments, R" may be limited to an H, an alkyl moiety, an amine moiety or combinations thereof. For example if R" is the alkyl moiety dimethyl butyl, the resulting methylene acceptor would be dimethylbutylhydroxyphenyl-phenylenediamine.

With these methylene acceptors, the hydroxyl moiety of the methylene acceptor activates reactive sites on its phenyl ring to link with the methylene donor provided in the rubber composition thereby providing the cross-linked resin having the antidegradant properties.

For example, if the methylene acceptor is dimethylpentylhydroxyphenyl-amine then, upon a condensation reaction with a methylene donor, the reaction product is of the form carbons, between 3 and 9 carbons, between 3 and 7 carbons, between 5 and 18 carbons, between 5 and 9 carbons or between 7 and 18 carbons. The alkyl moiety may be straight or branched.

The cycloalkyl moiety and the aryl moiety may be formed of between 3 and 7 members making up the ring or alternatively between 3 and 6 members, between 3 and 5 members, between 5 and 6 or between 4 and 6 members. The members are typically carbon but in some embodiments, the cycloalkyl and aryl moiety may be heterocyclic so that one or more of the members making up the ring may be nitrogen, sulfur, oxygen or combinations thereof, the remaining members being carbon.

The amine moiety may be a primary, a secondary or tertiary amine. In particular embodiments the amine moiety may be a secondary or tertiary amine.

Examples of useful methylene acceptors include 3-hydroxydiphenylamine (3-HDPA) and 4-hydroxydipheylamine (4-HDPA) (wherein R is H) and combinations thereof. Other examples include N-(1,3 dimethylbutyl)-N'-hydroxyphenyl-p-phenylenediamine (wherein R' is 1,3 dimethylbutyl), N-isopropyl-N'-hydroxyphenyl-p-phenylenediamine (wherein R' is isopropyl), N-(1,4 dimethylpentyl)-N'-hydroxyphenyl-p-phenylenediamine (wherein R' is 1,4 dimethylpentyl) and N-(ethyl)-N'-hydroxyphenyl-N'-p-phenylenediamine (wherein R' is ethyl), N-cyclohexyl-N'-hydroxyphenyl-p-phenylenediamine (wherein R' is cyclohexyl), N-phenyl-N'-hydroxyphenyl-p-phenylenediamine (wherein R' is phenyl), N-hydroxyphenyl-N'-tolyl-p-phenylenediamine (wherein R' is tolyl), N-(1,3 dimethylbutyl)-N'-dihydroxyphenyl-p-phenylenediamine (wherein R' is 1,3 dimethylbutyl).

It should be noted that these are merely examples of useful methylene acceptors. Other compounds may be considered by those having ordinary skill in the art who realize that a useful antidegradant may be incorporated into a resin

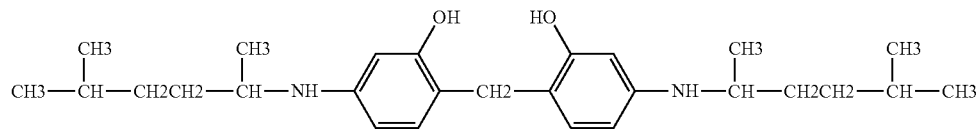

which is very similar to the well-known antidegradant 77PD, having the form network to provide antidegradant properties to a rubber composition while also linking the antidegradant into a resin

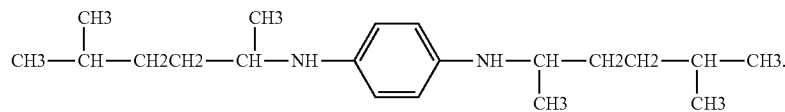

Advantageously, this compound resulting from the reaction with the methylene donor is a much larger compound that will not diffuse as easily through an article such as a tire and has antidegradant protection with the hydroxyl moieties in addition to the amino moieties.

In these forms, the R, R' and R" moieties may be characterized for particular embodiments per the following. The alkyl moiety may range, for example, between 1 and 18 carbons or alternatively between any range of the combination of such numbers including, for example, between 1 and 12 carbons, between 1 and 9 carbons, between 1 and 5 carbons, between 1 and 3 carbons, between 3 and 18 network to limit is ability to diffuse through the tire. Combinations of any of the useful methylene acceptors may also be used as appropriate for particular embodiments.

Suitable methylene donors that will react with the methylene acceptors may be selected, for example, from hexamethylenetetramine (HMT); hexamethoxymethylmelamine (HMMM); formaldehyde; paraformaldehyde; trioxane; 2-methyl-2-nitro-1-propanal; substituted melamine resins such as N-substituted oxymethylmelamine resins; glycoluril compounds such as tetramethoxymethyl glycoluril; urea-formaldehyde resins such as butylated urea-formaldehyde resins; or mixtures thereof. Hexamethylenetetramine (HMT), hexamethoxymethylmelamine (HMMM) or mixtures thereof are preferred methylene donors in particular embodiments. Any combination of these methylene donors and other suitable methylene donors may be used in particular embodiments.

The amount of the methylene acceptors added to the rubber compositions for particular embodiments disclosed herein is the amount that provides a sufficient degree of antidegradant protection to the rubber composition. Suitable amounts may be, for example, between 1 phr and 20 phr or alternatively between 0.5 phr and 20 phr, between 2 phr and 15 phr, 1 phr and 10 phr, between 0.5 phr and 7 phr or between 3 and 8 phr. Likewise, for those embodiments in which no or only a small increase in rigidity is desired, the methylene donor may be added in amount such that the ratio of the methylene acceptor to the methylene donor is at least greater than 10:1 or alternatively, at least 15:1 or between 15:1 and 50:1, between 15:1 and 40:1, between 15:1 and 30:1, between 20:1 and 25:1 or between 20:1 and 40:1.

Alternatively the amount of methylene donor may be added in amount that provides no more than a 100% increase in the MA100 rigidity measurement (at a temperature of 23° C. based on ASTM Standard D412) of the cured rubber composition as compared to the same rubber composition having no methylene donor added. Alternatively, the increase may be no more than 80%, no more than 50%, no more than 40%, no more than 30%, no more than 25%, no more than 20%, no more than 15%, no more than 10% or no more than 5%.

In particular embodiments, it may be preferred to have an increase in MA100 rigidity while at the same time providing the antidegradant properties to the rubber composition. In those embodiments, the amount of methylene donor would be that required to obtain the desired rigidity.

Of course one advantage in all of these embodiments is that the methylene acceptor having the antidegradant properties is made a part of a larger network to limit its ability to diffuse while at the same time, the amount of methylene donor can be provided to obtain the desired MA100 rigidity property of the rubber composition.

As noted, HDPA is a methylene acceptor that may be added to the rubber composition as 3-hydroxydiphenylamine (3-HDPA), 4-hydroxydipheylamine (4-HDPA) or as combinations thereof. 3-HDPA is available from Santa Cruz Biotechnology, Inc. with offices in California and 4-HDPA is available from NeoSources International with offices in Texas.

It should be noted that excellent cyclic fatigue resistance is also obtained from rubber compositions that just include the HDPA with no methylene donor. Therefore, for some embodiments, the rubber compositions disclosed herein may include just the HDPA or alternatively other methylene acceptors or combinations thereof having antidegradant properties with no methylene donor.

Within the ratios disclosed above, for particular embodiments of the rubber compositions disclosed herein for rubber compositions wherein there is desired little or no increase in the MA100 rigidity, the total amount of the methylene acceptor will be less than 0.5 phr or alternatively, between 0.05 phr and 0.45 phr, between 0.1 phr and 0.45 phr, between 0.2 phr and 0.4 phr or between 0.2 phr and 0.3 phr.

In addition to the methylene acceptors and methylene donors disclosed above, the rubber compositions disclosed herein include diene rubber. The useful elastomers of the rubber composition disclosed herein include highly unsaturated diene elastomers as well as essentially unsaturated, essentially saturated diene rubbers and combinations thereof. Diene elastomers or rubber is understood to mean those elastomers resulting at least in part (i.e., a homopolymer or a copolymer) from diene monomers (monomers bearing two double carbon-carbon bonds, whether conjugated or not). Essentially unsaturated diene elastomers are understood to mean those diene elastomers that result at least in part from conjugated diene monomers, having a content of members or units of diene origin (conjugated dienes) that are greater than 15 mol. %.

Thus, for example, diene elastomers such as butyl rubbers, nitrile rubbers or copolymers of dienes and of alpha-olefins of the ethylene-propylene diene terpolymer (EPDM) type or the ethylene-vinyl acetate copolymer type, do not fall within the preceding definition and may in particular be described as "essentially saturated" diene elastomers (low or very low content of units of diene origin, i.e., less than 15 mol. %). Particular embodiments of the present invention include no essentially saturated diene elastomers.

Within the category of essentially unsaturated diene elastomers are the highly unsaturated diene elastomers, which are understood to mean in particular diene elastomers having a content of units of diene origin (conjugated dienes) that is greater than 50 mol. %. Particular embodiments of the present invention may include not only no essentially saturated diene elastomers but also no essentially unsaturated diene elastomers that are not highly unsaturated.

The rubber elastomers suitable for use with particular embodiments of the present invention include highly unsaturated diene elastomers, for example, polybutadienes (BR), polyisoprenes (IR), natural rubber (NR), butadiene copolymers, isoprene copolymers and mixtures of these elastomers. The polyisoprenes include synthetic cis-1,4 polyisoprene, which may be characterized as possessing cis-1,4 bonds at more than 90 mol. % or alternatively, at more than 98 mol. %.

Also suitable for use in particular embodiments of the present invention are rubber elastomers that are copolymers and include, for example, butadiene-styrene copolymers (SBR), butadiene-isoprene copolymers (BIR), isoprene-styrene copolymers (SIR) and isoprene-butadiene-styrene copolymers (SBIR) and mixtures thereof.

It should be noted that any of the highly unsaturated elastomers may be utilized in particular embodiments as a functionalized elastomer. Elastomers can be functionalized by reacting them with suitable functionalizing agents prior to or in lieu of terminating the elastomer. Exemplary functionalizing agents include, but are not limited to, metal halides, metalloid halides, alkoxysilanes, imine-containing compounds, esters, ester-carboxylate metal complexes, alkyl ester carboxylate metal complexes, aldehydes or ketones, amides, isocyanates, isothiocyanates, imines, and epoxides. These types of functionalized elastomers are known to those of ordinary skill in the art. While particular embodiments may include one or more of these functionalized elastomers solely as the rubber component, other embodiments may include one or more of these functionalized elastomers mixed with one or more of the non-functionalized highly unsaturated elastomers.

In addition to the rubber component and the methylene acceptors/methylene donor system, a reinforcing filler is included in the rubber compositions disclosed herein. Reinforcing fillers are well known in the art and include, for example, carbon blacks and silica. Any reinforcing filler known to those skilled in the art may be used in the rubber composition either by themselves or in combination with other reinforcing fillers. In particular embodiments of the rubber composition disclosed herein, the filler is essentially a carbon black.

Carbon black, which is an organic filler, is well known to those having ordinary skill in the rubber compounding field. The carbon black included in the rubber compositions produced by the methods disclosed herein may, in particular embodiments for example, be in an amount of between 40 phr and 150 phr or alternatively between 50 phr and 100 phr.

Suitable carbon blacks are any carbon blacks known in the art and suitable for the given purpose. Suitable carbon blacks of the type HAP, ISAF and SAF, for example, are conventionally used in tire treads. Non-limiting examples of carbon blacks include, for example, the N115, N134, N234, N299, N326, N330, N339, N343, N347, N375 and the 600 series of carbon blacks, including, but not limited to N630, N650 and N660 carbon blacks.

As noted above, silica may also be useful as reinforcement filler. The silica may be any reinforcing silica known to one having ordinary skill in the art including, for example, any precipitated or pyrogenic silica having a BET surface area and a specific CTAB surface area both of which are less than 450 m$^2$/g or alternatively, between 30 and 400 m$^2$/g may be suitable for particular embodiments based on the desired properties of the cured rubber composition. Particular embodiments of rubber compositions disclosed herein may include a silica having a CTAB of between 80 and 200 m$^2$/g, between 100 and 190 m$^2$/g, between 120 and 190 m$^2$/g or between 140 and 180 m$^2$/g. The CTAB specific surface area is the external surface area determined in accordance with Standard AFNOR-NFT-45007 of November 1987.

Highly dispersible precipitated silicas (referred to as "HDS") may be useful in particular embodiments of such rubber compositions disclosed herein, wherein "highly dispersible silica" is understood to mean any silica having a substantial ability to disagglomerate and to disperse in an elastomeric matrix. Such determinations may be observed in known manner by electron or optical microscopy on thin sections. Examples of known highly dispersible silicas include, for example, Perkasil KS 430 from Akzo, the silica BV3380 from Degussa, the silicas Zeosil 1165 MP and 1115 MP from Rhodia, the silica Hi-Sil 2000 from PPG and the silicas Zeopol 8741 or 8745 from Huber.

When silica is added to the rubber composition, a proportional amount of a silane coupling agent is also added to the rubber composition. The silane coupling agent is a sulfur-containing organosilicon compound that reacts with the silanol groups of the silica during mixing and with the elastomers during vulcanization to provide improved properties of the cured rubber composition. A suitable coupling agent is one that is capable of establishing a sufficient chemical and/or physical bond between the inorganic filler and the diene elastomer; which is at least bifunctional, having, for example, the simplified general formula "Y-T-X", in which: Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica); X represents a functional group ("X" function) which is capable of bonding physically and/or chemically with the diene elastomer, for example by means of a sulfur atom; T represents a divalent organic group making it possible to link Y and X.

Any of the organosilicon compounds that contain sulfur and are known to one having ordinary skill in the art are useful for practicing embodiments of the present invention. Examples of suitable silane coupling agents having two atoms of silicon in the silane molecule include 3,3'-bis (triethoxysilylpropyl) disulfide and 3,3'-bis(triethoxysilylpropyl) tetrasulfide (known as Si69). Both of these are available commercially from Degussa as X75-S and X50-S respectively, though not in pure form. Degussa reports the molecular weight of the X50-S to be 532 g/mole and the X75-S to be 486 g/mole. Both of these commercially available products include the active component mixed 50-50 by weight with a N330 carbon black. Other examples of suitable silane coupling agents having two atoms of silicon in the silane molecule include 2,2'-bis(triethoxysilylethyl) tetrasulfide, 3,3'-bis(tri-t-butoxy-silylpropyl) disulfide and 3,3'-bis(di t-butylmethoxysilylpropyl) tetrasulfide. Examples of silane coupling agents having just one silicon atom in the silane molecule include, for example, 3,3' (triethoxysilylpropyl) disulfide and 3,3' (triethoxy-silylpropyl) tetrasulfide. The amount of silane coupling agent can vary over a suitable range as known to one having ordinary skill in the art. Typically the amount added is between 7 wt. % and 15 wt. % or alternatively between 8 wt. % and 12 wt. % or between 9 wt. % and 11 wt. % of the total weight of silica added to the rubber composition.

Particular embodiments of the rubber compositions disclosed herein may include no processing oil or very little, such no more than 5 phr. Processing oils are well known to one having ordinary skill in the art, are generally extracted from petroleum and are classified as being paraffinic, aromatic or naphthenic type processing oil, including MES and TDAE oils. Processing oils are also known to include, inter alia, plant-based oils, such as sunflower oil, rapeseed oil and vegetable oil. Some of the rubber compositions disclosed herein may include an elastomer, such as a styrene-butadiene rubber, that has been extended with one or more such processing oils but such oil is limited in the rubber composition of particular embodiments as being no more than 10 phr of the total elastomer content of the rubber composition.

The rubber compositions disclosed herein may further include, in addition to the compounds already described, all or part of the components often used in diene rubber compositions intended for the manufacture of tires, such as plasticizers, pigments, protective agents of the type that include antioxidants and/or antiozonants, vulcanization retarders, a vulcanization system based, for example, on sulfur or on a peroxide, vulcanization accelerators, vulcanization activators, extender oils and so forth. There may also be added, if desired, one or more conventional non-reinforcing fillers such as clays, bentonite, talc, chalk or kaolin.

The vulcanization system is preferably, for particular embodiments, one based on sulfur and on an accelerator but other vulcanization agents known to one skilled in the art may be useful as well. The vulcanization agents as used herein are those materials that cause the cross-linkage of the rubber and therefore may be added only to the productive mix so that premature curing does not occur, such agents including, for example, sulfur and peroxides. Use may be made of any compound capable of acting as an accelerator of the vulcanization of elastomers in the presence of sulfur, in particular those chosen from the group consisting of 2-mercaptobenzothiazyl disulfide (abbreviated to "MBTS"), N-cyclohexyl-2-benzothiazole-sulphenamide (abbreviated to "CBS"), N,N-dicyclohexyl-2-benzothiazolesulphenamide (abbreviated to "DCBS"), N-tert-butyl-2-benzothiazolesulphenamide (abbreviated to "TBBS"), N-tert-butyl-2-benzothiazole-sulphenimide (abbreviated to "TBSI") and the mixtures of these compounds. Preferably, a primary accelerator of the sulfenamide type is used.

The vulcanization system may further include various known secondary accelerators or vulcanization activators, such as zinc oxide, stearic acid and guanidine derivatives (in particular diphenylguanidine).

The rubber compositions that are embodiments of the present invention may be produced in suitable mixers in a manner known to those having ordinary skill in the art. Typically the mixing may occur using two successive preparation phases, a first phase of thermo-mechanical working at high temperature followed by a second phase of mechanical working at a lower temperature.

The first phase, sometimes referred to as a "non-productive" phase, includes thoroughly mixing, for example by kneading in a Banbury type mixer, the various ingredients of the composition but excluding the vulcanization agent (such as sulfur) and the methylene donor. It is carried out in a suitable kneading device, such as an internal mixer, until under the action of the mechanical working and the high shearing imposed on the mixture, a maximum temperature of generally between 120° C. and 190° C. is reached.

After cooling the mixture a second phase of mechanical working is implemented at a lower temperature. Sometimes referred to a "productive" phase, this finishing phase typically consists of incorporating the vulcanization system and the methylene donor into the rubber composition using a suitable device, such as an open mill. It is performed for an appropriate time (typically, for example, between 1 and 30 minutes or between 2 and 10 minutes), and at a sufficiently low temperature, i.e., lower than the vulcanization temperature of the mixture and lower than the cross-linking temperature of the methylene donor/acceptor system, so as to protect against premature vulcanization or resinification cross-linking.

The rubber composition can be formed into useful articles, including tire components. Tire treads, for example, may be formed as tread bands and then later made a part of a tire or they be formed directly onto a tire carcass by, for example, extrusion and then cured in a mold. Other components such as those located in the bead area of the tire or in the sidewall may be formed and assembled into a green tire and then cured with the curing of the tire. Likewise, fabric or metal may be coated with the rubber compositions for later incorporation into a tire building process as, for example, tire belts or cords.

The invention is further illustrated by the following examples, which are to be regarded only as illustrations and not delimitative of the invention in any way. The properties of the compositions disclosed in the examples were evaluated as described below.

Mooney Plasticity (ML 1+4) was measured in accordance with ASTM Standard D1646. In general, the composition in an uncured state is molded in a cylindrical enclosure and heated to 100° C. After 1 minute of preheating, the rotor turns within the test sample at 2 rpm, and the torque used for maintaining this movement is measured after 4 minutes of rotation. The Mooney Plasticity is expressed in "Mooney units" (MU, with 1 MU=0.83 Newton-meter).

Moduli of elongation (MPa) were measured at 10% (MA10) and at 100% (MA100) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

The elongation property was measured as elongation at break (%) and the corresponding elongation stress (MPa), which is measured at 23° C. in accordance with ASTM Standard D412 on ASTM C test pieces.

Tear properties were determined from test samples cut from a cured plaque with a thickness of approximately 2.5 mm. Notches (perpendicular to the test direction) were created in the samples prior to testing. The force and elongation at break was measured using an Instron 5565 Uniaxial Testing System. The cross-head speed was 500 mm/min. Samples were tested at ambient and at 60° C. and at 100° C.

Static ozone surface cracking was evaluated using a test closely related to the ASTM 1149-99 Standard Test Method for rubber deterioration titled Surface Ozone Cracking in a Chamber. The testing utilized in the examples that follow differs in the construction of the sample holder, which was a rod rather than a wooden block holder as required under the ASTM test method. Rectangular samples were cut with a die then folded in half and stapled such that the curvature of the loop has a maximum local strain of 18%.

These samples were hung on a rod for 2-5 days under ambient conditions before being placed in an ozone chamber. The ozone chamber conditions were set at 50 parts per hundred million ozone (pphm) and a temperature of 40° C. for one week. The samples were periodically evaluated for cracks. The samples were evaluated using the Rubber Deterioration Test Grades that consists of three numbers. The first number indicates the number of cracks in the sample, the second rates the width of the cracks and the third number is the depth of the crack. Zero indicates that no cracks were observed. The ozone cracking index is the product of the three numbers determined by the Rubber Deterioration Test Grades.

Cyclic fatigue testing was conducted on the cured test samples that were dumbbell shaped and 65 mm long. The test was conducted at ambient temperature by imposing cyclic strain from between 0% and 60% on the test pieces. The total number of cycles to failure was recorded for each test sample as the measurement of cyclic fatigue.

Example 1

This example illustrates the surprising increase in the resistance to ozone attack and fatigue failure by the rubber compositions in accordance with the present invention. The formulations were prepared with the component amounts shown in Table 1. The 4-HDPA was obtained from NeoSources International with offices in Texas. It should be noted that no anti-degradation chemicals were added to the rubber compositions that would mask the results achieved from the 4-HDPA.

TABLE 1

| Components | Formulations | | | | |
| --- | --- | --- | --- | --- | --- |
| | W1 | W2 | W3 | W4 | F1 |
| NR | 100 | 100 | 100 | 100 | 100 |
| Carbon Black, N326 | 55 | 55 | 55 | 55 | 55 |
| 4-HDPA | | | | 5 | 5 |
| Novolac Resin | | | 5 | | |
| Hexamethylenetetramine | | 0.25 | 0.25 | 0 | 0.25 |
| Processing Oil | 5 | 5 | 0 | 0 | 0 |
| Additives | 0 | 0 | 0 | 0 | 0 |
| Vulcanization Pkg. | 8 | 8 | 8 | 8 | 8 |

For each of the formulations described in Table 1, the natural rubber and all the other materials except for the sulfur, accelerators and the hexamethylenetetramine were added to a Bandury mixer and processed until well incorporated. The mixture was then dropped from the mixer, transferred to a mill and cooled.

The vulcanization package and the hexamethylenetetramine, where used, were added to the cooled mixture on the mill and the productive mix was milled for a time until the components were well mixed. The product was then tested for its properties in accordance with the testing procedures described above. For the cured properties, the product was cured for 25 minutes at 150° C.

TABLE 2

Physical Properties

|  | W1 | W2 | W3 | W4 | F1 |
|---|---|---|---|---|---|
| Uncured Properties |  |  |  |  |  |
| Mooney ML 1 + 4 | 78.3 | 76.7 | 99.5 | 84.7 | 83.2 |
| Cured Properties |  |  |  |  |  |
| MA10, MPa | 6.2 | 6.8 | 10.9 | 8.7 | 9.4 |
| MA100, MPa | 3.0 | 3.2 | 3.2 | 3.0 | 2.8 |
| Elongation Stress, MPa | 27 | 27 | 27 | 29 | 30 |
| Elongation at Break, % | 430 | 424 | 441 | 494 | 516 |
| Tear Force @23° C., N/mm | 86 | 80 | 113 | 103 | 116 |
| Tear Strain @ 23° C., % | 204 | 191 | 250 | 248 | 279 |
| Static Ozone Cracking Index | 8 | 4 | 9 | 4 | 1 |
| Cyclic Fatigue, Cycles | 16,606 | 34,060 | 24,612 | 110,025 | 98,725 |

As may be seen from the results in Table 2, the increase in the number of cycles that the rubber samples were able to endure before fatigue was surprisingly six times that of the first witness and 4 times that of the third witness. At the same time the resistance to static ozone cracking was by factors of at least 4 and the cohesive properties were also improved.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A method of manufacturing an article, comprising:
   blending together components of a cross-linkable rubber composition into a nonproductive mix, the components including a diene elastomer, a reinforcing filler and a methylene acceptor of the form

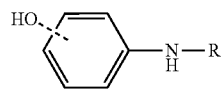

wherein R is selected from H, an alkyl moiety, a cycloalkyl moiety, an aryl moiety, an amine moiety or combinations thereof and wherein R is not a single phenyl moiety without combination;
   cooling the non-productive mix;
   mixing a methylene donor and a vulcanizing agent into the non-productive mix to convert the non-productive mix to a productive mix, wherein a ratio of the methylene acceptor to the methylene donor is greater than 15:1 and forming the article.

2. The method of claim 1, wherein R is a combination of a cycloalkyl moiety and an R' moiety, the methylene acceptor being of the form

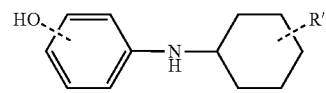

wherein R' is selected from H, an alkyl moiety, a cycloalkyl moiety, an aryl moiety, an amine moiety or combinations thereof.

3. The method of claim 2, wherein R' is an amine moiety.

4. The method of claim 1, wherein R is a combination of an aryl moiety and an R' moiety, the methylene acceptor being of the form

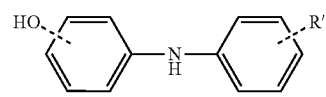

wherein R' is selected an alkyl moiety, a cycloalkyl moiety, an aryl moiety, an amine moiety or combinations thereof and wherein R' is not H.

5. The method of claim 4, wherein R' is an amine moiety, the methylene acceptor being of the form

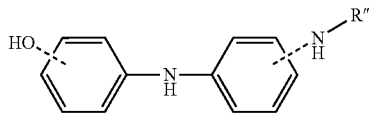

wherein R" is selected from H, an alkyl moiety, a cycloalkyl moiety, an aryl moiety, an amine or combinations thereof.

6. The method of claim 1, wherein a ratio of the methylene acceptor to the methylene donor is between 15:1 and 50:1.

7. The method of claim 6, wherein the ratio is between 15:1 and 30:1.

8. The method of claim 1, wherein an amount of the methylene acceptor is between 1 phr and 20 phr.

9. The method of claim 8, wherein the amount of the methylene acceptor is between 3 phr and 10 phr.

10. The method of claim 1, wherein the alkyl moiety contains between 1 and 18 carbons straight or branched.

11. The method of claim 1, wherein the cycloalkyl moiety contains between 3 and 7 members forming a ring and wherein the ring is heterocyclic or not.

12. The method of claim 1, wherein the aryl moiety contains between 3 and 7 members forming a ring and wherein the ring is heterocyclic or not.

13. The method of claim 1, wherein the diene elastomer is a highly unsaturated diene elastomer.

14. The method of claim 13, wherein the highly unsaturated diene elastomer is selected from a polybutadiene, a synthetic polyisoprene, a natural rubber, a butadiene-styrene copolymer or combinations thereof.

15. The method of claim 1, wherein the reinforcing filler is selected from a carbon black, a silica or combinations thereof.

16. The method of claim 1, wherein the methylene donor is added in an amount that provides no more than a 100% increase in an MA100 rigidity measurement of the rubber composition as measured at 23° C. in accordance with ASTM D412 as compared to a second identical rubber composition except without the methylene donor.

17. The method of claim 16, wherein the amount provides no more than a 25% increase in the MA100 rigidity measurement.

18. The method of claim 1, wherein the article is a tire component is selected from a tread, an undertread, a sidewall component, a bead area component, a shoulder component, a rubber coating or combinations thereof.

* * * * *